United States Patent [19]

Anno

[11] Patent Number: 4,620,800
[45] Date of Patent: Nov. 4, 1986

[54] HIGH LEVEL GAMMA RADIATION DOSIMETER

[75] Inventor: James N. Anno, Cincinnati, Ohio

[73] Assignee: Research Dynamics Incorporated, Cincinnati, Ohio

[21] Appl. No.: 587,562

[22] Filed: Mar. 8, 1984

[51] Int. Cl.[4] .................. G01K 17/00; G01T 1/29
[52] U.S. Cl. ................................ 374/132; 250/391; 376/247
[58] Field of Search ............... 374/45, 170, 133, 132; 364/557; 73/863.11, 864.91; 376/247, 258

[56] References Cited

U.S. PATENT DOCUMENTS

| | | | |
|---|---|---|---|
| 2,816,232 | 12/1957 | Burstein | 374/132 X |
| 3,075,386 | 1/1963 | Daly | 374/133 |
| 3,373,599 | 3/1968 | Higginbottom | 374/208 X |
| 3,511,091 | 5/1970 | Thome | 376/247 X |
| 4,158,965 | 6/1979 | Prosky | 376/164 X |
| 4,283,948 | 8/1981 | Longsworth | 73/863.11 |
| 4,307,388 | 12/1981 | Doenges et al. | 250/352 X |
| 4,312,224 | 1/1982 | Domen | 250/352 |
| 4,313,792 | 2/1982 | Smith | 376/247 |
| 4,406,011 | 9/1983 | Burns | 376/247 |
| 4,425,810 | 1/1984 | Simon et al. | 374/45 X |
| 4,426,160 | 1/1984 | Couderc | 374/45 |
| 4,445,367 | 5/1984 | Goldsmid | 374/45 |
| 4,459,045 | 7/1984 | Smith, II | 374/132 |

Primary Examiner—Daniel M. Yasich
Attorney, Agent, or Firm—Frost & Jacobs

[57] ABSTRACT

A direct dosimeter for measuring gamma radiation flux having dose rates in excess of 0.1 megarad/hr. The dosimeter includes a gamma heating material such as aluminum or lead positioned in an evacuated housing. A thermocouple measures the temperature of the material when subjected to high levels of gamma radiation. From the time rate of change of the temperature measurements, the absolute value of gamma radiation flux may be determined before the temperature of the material has reached a steady state value.

28 Claims, 3 Drawing Figures

HIGH LEVEL GAMMA RADIATION DOSIMETER

SUMMARY OF THE INVENTION

The present invention is directed generally to a direct dosimeter for the absolute measurement of gamma radiation flux in excess of about 0.1 megarad/hr, and more particularly to a gamma radiation measuring dosimeter utilizing gamma heating to determine the radiation field in the vicinity of the dosimeter.

The subject matter of the present application has been previously disclosed in Disclosure Document No. 120,531, filed Sept. 13, 1983.

In many applications, it is necessary to measure the intensity of relatively high level gamma radiation, for example, in monitoring the radiation flux at the face of a nuclear fission reactor. As will be expected, the gamma radiation flux at the face of a nuclear fission reactor is quite high, on the order of 20–30 megarad/hr. Consequently, as used herein, "high level" gamma radiation refers to such radiation in excess of about 0.1 megarad/hr.

In conventional practice, most high dose rate instruments for measuring high level gamma radiation are limited to about 10 megarads total dose. This limitation is often due to radiation damage to the instrument, commonly the electrical insulators.

The present invention overcomes these limitations through a direct dosimeter capable of extremely high dose rates and total dosage before appreciable deterioration. In its basic principle, the present invention measures the time rate of change of gamma heating when the dosimeter instrument is placed in a gamma radiation field to derive a measure of the radiation dose rate of that field.

Fundamentally, gamma heating refers to the temperature rise in a material when exposed to gamma radiation. For example, in the case of a small body whose temperature is sufficiently uniform to be considered independent of the position within the body, and where heat loss occurs from the body only by heat transfer from the surface at a rate proportional to the temperature difference between the body and its surroundings, the net change in heat content of the body, upon heating, can be expressed as:

$$V\rho C_p (dT/dt) = gV - hST(t)$$

where:
V = volume of the body
$\rho$ = density
$C_p$ = specific heat
T = temperature
t = time
g = heat generation rate per unit volume due to gamma radiation
h = heat transfer coefficient
S = surface area effective in heat transfer It will be observed that the expression used to relate these variables assumes that the temperature of the surroundings is zero. Furthermore, it will be observed that the left-hand portion of this expression is the time rate of change of heat content of the body, while the germ gV represents the heat generation rates in the body and the term hST(t) is the time rate of change of external heat loss.

If the substitution $\lambda = hS/\rho VC_p$ is made in the above expression, it becomes:

$$\frac{dT}{dt} = \frac{g}{\rho C_p} - \lambda T(t) = \lambda \left( \frac{g}{\rho C_p \lambda} - T(t) \right).$$

If the additional substitution is made $\mu = \rho C_p \lambda$, the expression then becomes:

$$\frac{dT}{dt} = \lambda \left( \frac{g}{\mu} - T(t) \right)$$

Upon setting the initial temperature of the body to zero, and solving this expression, the temperature at time t is given as:

$$T(t) = (g/\mu)(1 - e^{-\lambda t})$$

This expression represents the gamma heating equation for the body. It will be observed that at equilibrium, the steady state temperature has a value of $$g/\mu$$

Under conditions where the body has an initial temperature $T_o$, with no heat generation, the time rate of change of the temperature of the body may be expressed as:

$$dT/dt = -\lambda T(t)$$

Consequently, the temperature at any time t is given by:

$$T(t) = T_o e^{-\lambda t}$$

This last expression is the cooling equation. In other words, if the body is heated to a temperature $T_o$, and thereafter the heat source is removed and the body is allowed to cool, the value of $\lambda$ can be found from a semilog plot of the cooling curve. Utilizing this value of $\lambda$, a plot of $T(t)$ versus $(1 - e^{-\lambda t})$ will yield a slope of $g/\mu$. Since $g/\mu = g/\rho C_p \lambda$, the gamma heating rate per unit mass, $g/\rho$, can be readily found once the value of $C_p$ is given. It should also be noted that $g/\rho$ has units of joules/sec-gm, which can be directly converted to a rad/hr dose rate to give the gamma flux rate in the region containing the body.

It will be observed that in the foregoing analysis, the rate of loss of heat must be proportional to the temperature difference between the body and its surroundings, the temperature of the body must be substantially uniform, and the temperature of the surroundings must also be substantially uniform. This first condition is generally met for heat transfer by conduction if the temperature changes are small enough to avoid changes in thermal conductivity. This will be true with many types of materials. The first condition is also met approximately for heat transfer by radiation since the rate of heat transfer is $q \approx 4KT^3 \Delta T$ if the temperature difference, $\Delta T$, is small compared to T. However, the first condition is not met by heat transfer by free convection, since the convection heat transfer coefficient is approximately proportional to $(\Delta T)^{\frac{1}{4}}$. Consequently, in order that the first of these conditions be met for all types of heat transfer mechanisms, it is necessary that heat transfer by convection be negligible compared to heat transfer by conduction and radiation. This may be accomplished by placing the body in a vacuum.

In the present invention, by attaching a thermocouple to a small sample of material of known specific heat, measurement of the heating and cooling curves in a small evacuated chamber can be used to determine the heat generation rate, and consequently the gamma radiation dose rate.

In a preferred embodiment of the invention, a small cylindrical plug of heat conducting material having a substantially constant specific heat is positioned within a chamber housing having an interior space evacuated to a sufficiently low pressure such that heat transfer from the material plug by convection is substantially negligible compared to heat transfer from the material plug by conduction and radiation. A radiation resistant thermocouple is attached to the plug for measuring its temperature.

As noted above, the device can be initially calibrated by heating the material plug to a temperature $T_o$, and removing the heat source to allow the material to cool. Utilizing the cooling equation, the value of $\lambda$, which is a constant for the device, can then be found from a semilog plot of the cooling curve. As will be described in more detail hereinafter, this initial calibration may be carried out by immersing the dosimeter in a gamma radiation field of known strength, or by merely heating the entire dosimeter to a known temperature to establish the initial temperature, $T_o$.

As can be determined from the expressions set forth hereinabove, the time rate of change of the temperature of the material plug is given by the relationship:

$$\left(\frac{dT}{dt}\right) = \frac{g}{\rho C_p} e^{-\lambda t}$$

Since the quantity $g/\rho$ is the radiation dose rate, it is only necessary to have an accurate value for the specific heat $C_p$ of the material used for the plug to obtain the dose rate at any particular time t. In fact, it will be observed that the initial slope of the curve given by this expression at $t=0$ is:

$(dT/dt)_{t=0} = g/\rho C_p$ which is independent of the value $\lambda$. Consequently, in order to obtain the dose rate using the dosimeter of the present invention, it is only necessary to immerse the dosimeter into the gamma radiation field, measure the time rate of change of temperature of the material plug within the dosimeter, and derive therefrom the gamma radiation dose rate utilizing an appropriate conversion of units. This may be carried out manually, or by means of a suitable digital processor.

Further features of the invention will become apparent from the detailed description which follows.

DETAILED DESCRIPTION

Figure 1:
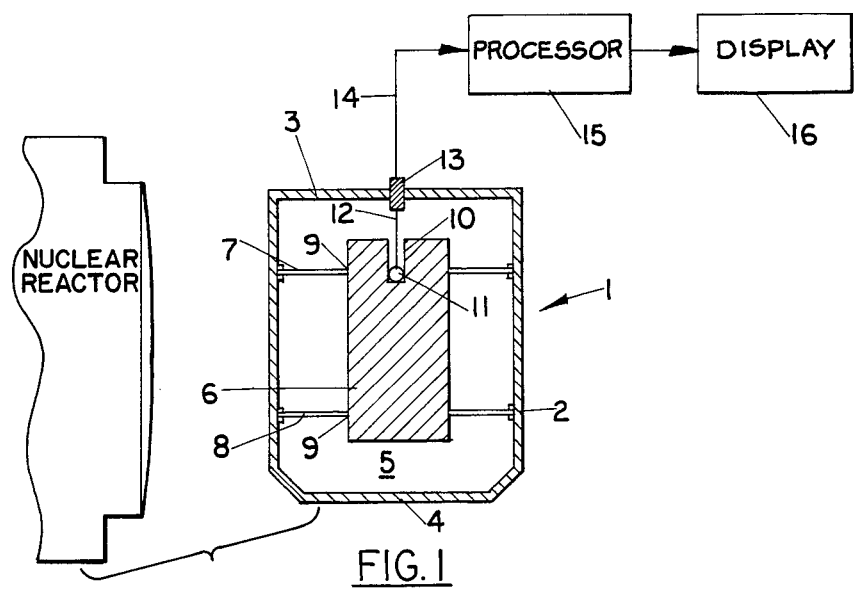
FIG. 1 is a diagrammatic front elevational view of the high level gamma radiation dosimeter of the present invention.

An exemplary embodiment of the high level gamma radiation direct dosimeter of the present invention is illustrated schematically at 1 in FIG. 1. Dosimeter 1 comprises a generally cylindrical thin-walled housing 2 having an upper end cap 3 and a lower end cap 4. The interior of housing 2 forms a cavity space 5 which may be evacuated to form a mild or partial vacuum with a pressure of no more than about 10 torr. As will be explained in more detail hereinafter, evacuating the air from cavity 5 serves to reduce convection heat transfer effects from the gamma heating material. Housing 2 may be constructed of any suitable metallic or non-metallic material, preferably one relatively transparent to and unaffected by gamma radiation or other electromagnetic radiation to which dosimeter 1 may be exposed.

Positioned within cavity space 5 is an elongated cylindrical-shaped plug 6 forming the gamma heating material. The gamma heating material 6 is spaced from the interior walls of housing 2 by a pair of disc-shaped vertically spaced positioning fins 7 and 8, respectively. Each of fins 7 and 8 has an interior aperture 9 which is fixedly attached circumferentially to the outer surface of gamma heating material 6. The outer edges of each of the positioning fins 7 and 8 are fixedly secured to the inside cylindrical wall of housing 2 so that the gamma heating material plug 6 is held rigidly coaxially within housing 2. It will be understood that positioning fins 7 and 8 are fabricated from a non-heat conducting radiation resistant material to minimize the transfer of heat from plug 6 to housing 2 by conduction through the fins. Furthermore, positioning fins 7 and 8 will be preferably constructed from a material which is relatively transparent to gamma radiation so as not to shield gamma heating material plug 6.

In general, any material with a known specific heat which is substantially constant over the temperature range encountered in dosimeter 1 may be utilized as gamma heating material 6. Nonetheless, it will be observed that several factors need to be taken into account in selection of the gamma heating material. As can be seen from the equation set forth hereinabove, a relatively dense material with a large atomic number Z, such as lead, will produce a greater time rate of change of heat content of the gamma heating material, and consequently a dosimeter instrument having a greater sensitivity. At the same time, however, the greater density of the lead material, as well as its size, will also tend to produce a "self-shielding" effect which will tend to reduce the gamma heating of the material 6.

Figure 2:
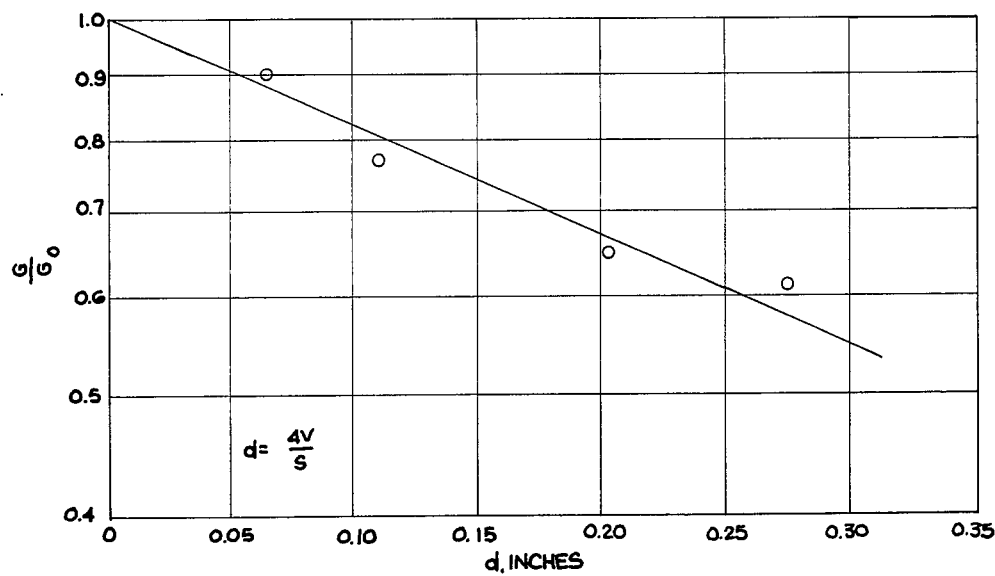
FIG. 2 is a graphical representation of typical gamma heating of lead samples at a reactor core face.

For example, Table I and FIG. 2 illustrate gamma heating results utilizing a cylindrical plug at a reactor core face. In the case of Table I, the gamma heating for various sized cylindrical plugs is illustrated when the plug was exposed to the tabulated gamma dose rate in water, approximately four inches from the face of a pool-type research reactor core. In FIG. 2, the relative value of gamma heating $(G/G_0)$ is plotted against plug diameter for variously sized cylindrical-shaped lead plugs.

From these data, it can be seen that for cylindrical-shaped gamma material plugs having a diameter of less than about one sixteenth (0.0625) inch, the required correction factor, i.e. the reduced level of gamma heating as reflected by the relative value (G/G₀), is less than about 10%.

For a gamma material having a smaller atomic weight, such as aluminum, the heating rate (on a per gram basis) will be smaller, but the gamma heating material plug, for a given size, will perturb the gamma field to a less significant degree than a material having a higher atomic number, thus producing a less significant self-shielding effect. Consequently, in the case of a material having a lower atomic number such as aluminum, the required correction factor will be much smaller than that necessary with a higher atomic weight material. In any event, regardless of the type of gamma heating material used, it is apparent that the small size of the cylindrical-shaped gamma material plug required will result in a correspondingly small sized dosimeter structure. Certainly, the choice of the specific gamma material to be used will involve a trade-off between shelf-shielding, sensitivity and plug size.

In prder to measure the temperature of the gamma heating material 6, a small axial channel 10 is provided in the upper end of gamma heating material plug 6, into which is placed a radiation resistant thermocouple 11. It will be understood that thermocouple 11 is positioned in heat conducting relationship with the gamma heating material so as to measure the temperature of plug 6.

The wire leads 12 from thermocouple 11, which may be ceramic coated and shielded as is well known in the art, pass through an electrical connector or feedthrough 13, to exterior sensor wire 14, which may be connected, at a location remote from dosimeter 1, to a suitable data processor 15.

In a preferred embodiment, processor 15 may comprise a digital computer for calculating the gamma radiation dose rate in real time to providing a read-out of the dose rate on a suitable display 16. Alternatively, the dose rate may be calculated manually or graphically using the mathematical relationships set forth hereinabove.

Where a digital computer is employed, a suitable computer program may be embodied in a semiconductor ROM as firmware in order to carry out the calculative steps necessary to derive the radiation dose rate. For example, FIG. 3 illustrates an exemplary flow chart which can be employed in the processing of processor 15 for calculating the dose rate value.

Figure 3:
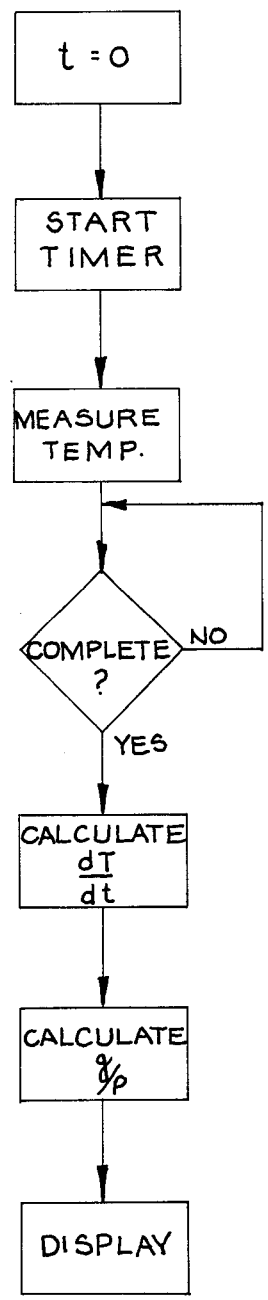
FIG. 3 is an exemplary flow diagram for use with the dosimeter of the present invention for calculating the gamma radiation dose rate from the gamma heating time rate of change.

In the flow diagram of FIG. 3, a timer is started at time t=0. This may occur when dosimeter 1 is initially exposed to the gamma radiation, or at any time thereafter, provided that the temperature of gamma heating material 6 has not yet reached steady state conditions, i.e. the temperature of the gamma heating material is still increasing with time.

Thereafter, the processing proceeds to measure and record the temperature, through thermocouple 11, of the gamma heating material, at discrete time intervals. This measurement process continues, either for a perdetermined time, or until sufficient data points have been accumulated to calculate the slope of the temperature/time curve. At this point, the slope of the curve $dT/dt$ is calculated from the accumulated temperature/time data, using any suitable calculation technique. It will be observed that for very small time increments, $dT/dt \approx \Delta T/\Delta t$.

Thereafter, the processor calculates the value $g/\rho$ using the expression set forth hereinabove. Specifically, this value can be calculated from the relationship:

$$g/\rho = C_p e^{\lambda t}(dT/dt)|_{t=t_1}$$

This value is evaluated at some specific time, $t=t_1$. This calculated value has units of joules/sec-gm, which can be directly converted to the required rad/hr dose rate, and displayed on a suitable display 16.

It will be observed that this last calculation step requires known values for $C_p$, the specific heat, and $\lambda$. The former value is known from the material itself. It is preferable that a material be utilized for the gamma heating material for which the specific heat is relatively constant with temperature changes. The value of $\lambda$ can be calculated when the dosimeter 1 is initially calibrated as described hereinabove by heating the gamma heating material 6 to a predetermined temperature $T_o$ (either by gamma radiation flux or other heating means), removing the heat source, and allowing the gamma heating material to cool. Since the relationship of temperature to time is given by the expression:

$$T(t) = T_o e^{-\lambda t}$$

the value of $\lambda$ may be easily found from the slope of the straight line plot of the logarithm of temperature vs. time. This value will be constant for the dosimeter, and can thus be used as a calibration value in the calculation of the radiation dose rate described hereinabove.

It will be observed that the dosimeter hereinabove described can be made in a relatively small size for directly reading high levels of gamma radiation. The construction of the dosimeter is such that its components will not be effected by high dose rates or accumulated total dosage. Furthermore, the dose rate measured by the dosimeter of the present invention is dependent on the rate of temperature rise, rather than measurement of a steady state temperature. Consequently, a measurement may be quickly taken without the need to maintain the dosimeter in the radiation flux field until steady state temperature conditions are reached. The abasence of a heat sink associated with the gamma heating material also increases the sensitivity of the device, and reduces the time necessary for an accurate radiation dose reading. Finally, the device only requires a single thermocouple, which serves to measure the actual temperature of the gamma heating material.

It will also be observed that the dosimeter of the present invention can be tested by merely heating the device, so as to raise the temperature of the gamma heating material. Consequently, the operability of the dosimeter can be verified without exposing the dosimeter to high level gamma radiation.

It will be understood that various changes in the details, steps, materials and arrangements of parts, which have been herein described and illustrated in order to explain the nature of the invention, may be made by those skilled in the art without the scope and principle of the invention as expressed in the appended claims.

TABLE I

GAMMA HEATING DATA FOR VARYING SIZES OF LEAD SAMPLES

| Sample Wt. (grams) | Dimensions (Diameter) × (Length) inches | Gamma Dose Rate (R/hr) | Gamma Heating Milliwatts atom R/hr |
|---|---|---|---|
| 10.250 | 0.376 × 0.505 | 2.36 × 10⁷ | 1.68 × 10⁻²⁷ |
| 4.609 | 0.251 × 0.522 | 2.63 × 10⁷ | 1.80 × 10⁻²⁷ |
| 0.982 | 0.122 × 0.523 | 2.62 × 10⁷ | 2.12 × 10⁻²⁷ |

TABLE I-continued

GAMMA HEATING DATA FOR VARYING SIZES OF LEAD SAMPLES

| Sample Wt. (grams) | Dimensions (Diameter) × (Length) inches | Gamma Dose Rate (R/hr) | Gamma Heating Milliwatts atom R/hr |
|---|---|---|---|
| 0.279 | 0.065 × 0.526 | $2.70 \times 10^7$ | $2.47 \times 10^{-27}$ |

The embodiments of the invention in which an exclusive property or privilege is claimed are as follows:

1. A direct dosimeter for the absolute measurement of high level gamma radiation flux in excess of about 0.1 megarad/hr in a gamma radiation field comprising:
a portable housing having an interior space evacuated to a partial pressure at least;
a body of heat conducting material having a substantially constant specific heat positioned within said space in non-heat conducting relationship with said housing with spaced thermal insulating means mounting said body to said housing wherein the temperature of said body when heated by gamma radiation in said gamma radiation field is substantially constant and the rate of heat loss of the body is substantially proportional to the temperature of the body and the temperature of said space, said space being evacuated to a sufficiently low pressure so that heat transfer from the plate by convection is substantially negligible compared to heat transfer from the plate by conduction and radiation; and
radiation resistant thermocouple means attached to said body for measuring and for processing the time rate of temperature change of the body.

2. The dosimeter according to claim 1 wherein said pressure is no greater than about 10 torr.

3. The dosimeter according to claim 1 wherein means is provided for supporting said body within said housing such that heat transfer from the body by conduction is minimized.

4. The dosimeter according to claim 1 wherein said body comprises a metallic material.

5. The dosimeter according to claim 4 wherein said body is of substantially cylindrical shape with a diameter no greater than about 1/16 inch.

6. The dosimeter according to claim 5 wherein said material comprises lead.

7. The dosimeter according to claim 5 wherein said material a low atomic number.

8. The dosimeter according to claim 1 wherein said pressure is no greater than about 10 torr, and including means for supporting said body within said housing such that heat transfer from the body by conduction is minimized, said body being of substantially cylindrical shape with a diameter of no greater than about 1/16 inch.

9. The dosimeter according to claim 8 wherein said body comprises a metallic material.

10. Apparatus for the direct measurement of high level gamma radiation flux in excess of about 0.1 megarad/hr comprising:
means mounted in an evacuated portable housing so as to minimize heat conduction between said means and said housing, said means heated by a gamma radiation flux to produce an increase in temperature when exposed to gamma radiation flux in a gamma radiation field having a dose rate in excess of about 0.1 megarad/hr;
means contacting said means through said housing for measuring the time rate of change of temperature of said heated means; and
means for calculating the absolute value of the gamma radiation flux from said time rate of change measurement.

11. The dosimeter according to claim 10, wherein said heated means includes means for minimizing heat transfer from said heated means such that the rate of heat loss from said heated means is substantially proportional to the difference in temperature between said heated means and its environment.

12. The apparatus according to claim 11, wherein said means for minimizng heat transfer comprises a vacuum having a pressure of no more than about 10 torr surrounding said heated means.

13. The apparatus according to claim 12, further including means for minimizing heat transfer by conduction from said heated means.

14. The apparatus according to claim 10 wherein said measuring means comprises gamma radiation resistant thermocouple means attached to said heated means for measuring the temperature of the entire heated means.

15. The apparatus according to claim 14 wherein said thermocouple means comprises a single thermocouple.

16. The apparatus according to claim 10 wherein said calculating means comprises means for measuring the temperature T of said heated means at a plurality of successive discrete times t and means for calculating the time rate of change valued dT/dt from said temperature and time measurements.

17. The apparatus according to claim 16 wherein said calculating means includes means for calculating the absolute value of gamma radiation flux $g/\rho$ from the relationship:

$$g/\rho = C_p e^{\lambda t}(dT/dt)$$

where:
$C_p$ = specific heat of the heated means
$\lambda$ = a constant value evaluated from the cooling curve relationship for the heated means
$T = T_0 e^{-\lambda t}$, where $T_0$ is the initial temperature of the heated means;
dT/dt is calculated at a time t less than the time necessary for the heated means to reach a steady state temperature.

18. The apparatus according to claim 17 wherein said time measurement means operates to measure said temperatures at times before the heated means has reached a steady state temperature.

19. The apparatus according to claim 10, wherein said heated means includes means for minimizing heat transfer by convection from said heated means such that the rate of heat loss from said heating means is substantially proportional to the difference in temperature between said heating means and its environment, said means for minimizing heat transfer comprising a vacuum having a pressure of no more than about 10 torr surrounding said heated means, said measuring means comprising gamma radiation resistant thermocouple means attached to said heated means for measuring the temperature of the entire heated means, said thermocouple means comprising a single thermocouple.

20. The apparatus according to claim 19 wherein said calculating means comprises means for measuring the temperature T of said heated means at a plurality of successive discrete times t and means for calculating the time rate of change value (dT/dt)l from said temperature and time measurements, said calculating means including means for calculating the absolute value of gamma radiation flux g/ρ from the relationship $$g/\rho = C_p e^{\lambda t}(dT/dt)$$

where:
- $C_p$ = specific heat of the heated means
- $\lambda$ = a constant value evaluated from the cooling curve relationship for the heated means $T = T_0 e^{-\lambda t}$, where $T_0$ is the initial temperature of the heated means;
- dT/dt is calculated at a time t less than the time necessary for the heated means to reach a steady state temperature; and
- wherein said time measurement means operates to measure said temperatures at times before the heated means has reached a steady-state temperature.

21. The apparatus according to claim 20 further including means for minimizing heat transfer by conduction from said heated means.

22. A method for measuring high level gamma radiation flux in excess of about 0.1 megarad/hr comprising:
  - exposing a gamma heat conducting material to the radiation flux in a gamma radiation field so as to produce a temperature rise in said material;
  - mounting said heat conducting material in an evacuated portable housing so as to minimize heat conducted between said heat conducting material and said housing;
  - measuring with contact probe through said housing the time rate of change of said temperature of said material; and
  - calculating from said time rate of change measurement the absolute value of a gamma radiation flux.

23. The method according to claim 22 wherein said measuring step includes the step of measuring the temperature T of the said material at a plurality of successive discrete times t.

24. The method according to claim 23 wherein said measuring step further includes calculating from said time and temperature measurements a time rate of change value dT/dt.

25. The method according to claim 24 wherein said radiation flux calculating step includes the step of calculating the absolute value of the gamma radiation flux g/ρ from the relationship:

$$g/\rho = C_p e^{\lambda t}(dT/dt)$$

where:
- $C_p$ = specific heat of the material
- $\lambda$ = a constant value; and
- dT/dt is calculated at a time t less than the time necessary for the material to reach a steady state temperature.

26. The method according to claim 25 including the step of calculating the value λ from said material cooling curve relationship for the material $T = T_0 e^{-\lambda t}$, where $T_0$ is the initial temperature of the material.

27. The method according to claim 26 wherein said temperatures are measured before said material has reached a steady state temperature.

28. The method according to claim 22 wherein said temperatures are measured before said material has reached a steady state temperature.

* * * * *